J. RAU.
GLASS TEMPERING DEVICE.
APPLICATION FILED NOV. 13, 1914.
1,266,625.
Patented May 21, 1918.
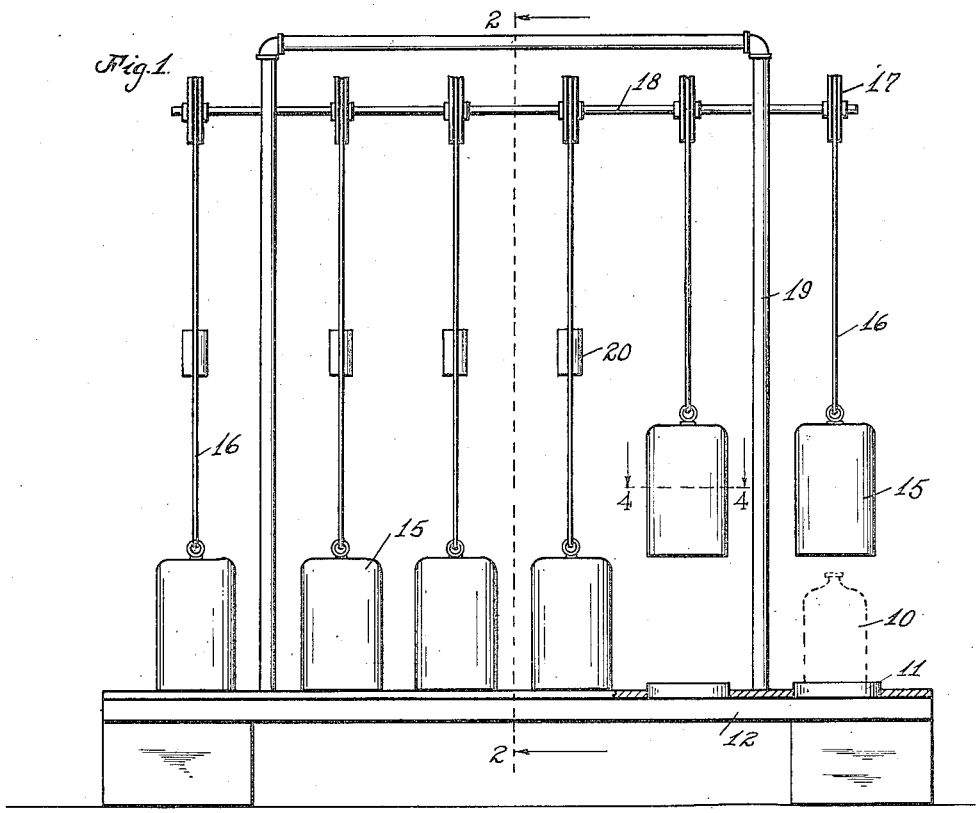
Fig. 1.
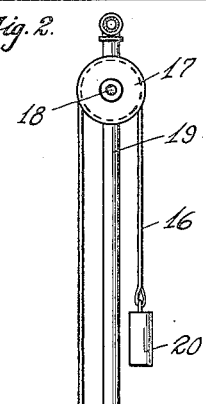
Fig. 2.
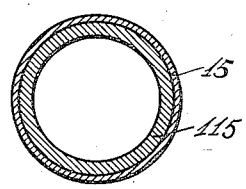
Fig. 4.
Fig. 3.
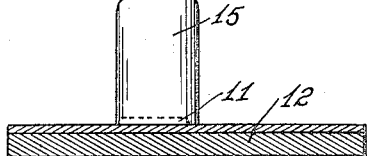
WITNESSES:
A. H. Edgerton
R. H. Lockwood
INVENTOR
John Rau
BY
V. H. Lockwood
ATTORNEY

UNITED STATES PATENT OFFICE.

JOHN RAU, OF INDIANAPOLIS, INDIANA.

GLASS-TEMPERING DEVICE.

1,266,625.

Specification of Letters Patent. Patented May 21, 1918.

Application filed November 13, 1914. Serial No. 871,901.

*To all whom it may concern:*

Be it known that I, JOHN RAU, a citizen of the United States, and a resident of Indianapolis, county of Marion, and State of Indiana, have invented a certain new and useful Glass-Tempering Device; and I do hereby declare that the following is a full, clear, and exact description thereof, reference being had to the accompanying drawings, in which like letters refer to like parts.

The object of this invention is to regulate the tempering of large hollow bottles or other hollow glassware. In making such large bottles, it is necessary to maintain the heat of the upper part of the bottle while the bottom which is heavy cools. If such glass articles are taken from the molds and placed at once in the open air, a large percentage of them are injured by the air cooling them too suddenly. This device retards the cooling of them and thus tempers and saves them from bursting.

Another feature of the invention is the provision of bottom plates shaped to conform to the bottom of the bottles upon which the bottles may be placed when first taken from the molds and thus, while the glass in the bottom of the bottle is rather soft, its form will be maintained by the bottom plate upon which it rests until the glass becomes set and tempered sufficiently for it to retain its form.

The full nature of the invention will be understood from the accompanying drawings and the following description and claim.

In the drawings, Figure 1 is a front elevation of the mechanism showing one hood elevated for the removal of a bottle and the remaining hoods lowered inclosing the bottles. Fig. 2 is a section on the line 2—2 of Fig. 1. Fig. 3 is a central section through a bottom plate. Fig. 4 is a central vertical section of a hood.

The bottles 10 are large having a capacity of five, ten or fifteen gallons, and as they are taken from the molds they are placed upon bottom plates 11 which are secured upon a table 12. There is a row of these bottom plates shown herein and each plate 11 has its upper surface 13 shaped to conform with the shape of the bottom of the bottle 10. Therefore, when the bottle is placed upon said bottom plate, the latter will reinforce the bottom of the bottle and hold the glass thereof in position and shape until fully set or cooled sufficiently for it to maintain its shape. After the device has been used a few moments, these bottom plates 11 all become heated and, therefore, there is not sufficient difference of temperature between them and the bottoms of the bottles to cause the glass to chill and break.

After a bottle 10 is placed upon a bottom 11, a hood 15 is placed over the bottle and bottom plate and rests upon the table 12. The hood is lined with asbestos 115 and is closed excepting at its lower end and its internal diameter is only slightly greater than the diameter of the plate so that it fits rather snugly around said plate. The hoods are preferably manipulated by the means shown herein. A cable 16 is connected with the top of the hood and it runs over a sheave 17 on a horizontal rod 18 mounted in connection with a frame 19 which extends up from the table 12. The weight of the hood is counterbalanced by a weight 20, so that either the hood or weight will stay down when it is moved to its down position, and will stay up when it is elevated.

In operation, the mechanism is arranged to provide a number of these hoods and bottom plates and the bottles are placed on them in succession and as soon as one hood is elevated and the bottle removed, another bottle is put in the place of the removed bottle and this is done in succession and by the time the bottles have been placed in all of the hoods, each bottle will have become sufficiently tempered to maintain its form and will not be seriously influenced by the difference between its temperature and that of the atmosphere so that the bottle can be safely removed from this device to the leer. Since the bottom is heavy, the top must be kept hot while the bottom is cooling.

The invention claimed is:

A device for tempering large glassware including a table, a rigid frame extending upward therefrom, a rod mounted on said frame above said table, independent pulleys on said rod, a cable on each pulley, a hood on one end of each cable and adapted to be lowered upon said table and coöperate therewith for inclosing the glassware, and a counterbalancing weight on the other end of each cable.

In witness whereof I have hereunto affixed my signature in the presence of the witnesses herein named.

JOHN RAU.

Witnesses:
J. H. WELLS,
R. G. LOCKWOOD.